2,969,365
ADDITION COMPOUNDS OF CYCLIC DIAMINES WITH VICINAL GLYCOLS

William W. Levis, Jr., Wyandotte, Mich., assignor to Wyandotte Chemicals Corporation, Wyandotte, Mich., a corporation of Michigan No Drawing. Filed Dec. 23, 1957, Ser. No. 704,360

7 Claims. (Cl. 260—268)

This invention relates to new compositions of matter comprising the addition compounds of vicinal glycols with cyclic diamines. More particularly, this invention relates to addition compounds formed by reacting a vicinal glycol of the formula:

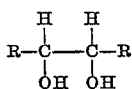

with a cyclic diamine of the formula:

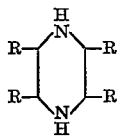

wherein R is either a hydrogen, methyl or ethyl radical.

The compositions of the invention are either liquid or solid addition compounds having well defined physical properties and can be readily prepared by reacting a vicinal glycol with a cyclic diamine in a suitable container. The reaction can also be carried out in the presence of a solvent or by melting the reactants together and adding a recrystallizing solvent to the melt.

The addition compounds of the invention are useful in the formation of polymers. Thus, mixed polyester-polyamide polymers can be prepared by heating dibasic acids in the presence of the addition compounds of the invention. Examples of the dibasic acids include adipic acid, maleic acid anhydride, terephthalic acid and sebacic acid. Also, the addition compounds can be used as curing agents in the formation of polyurethanes. In addition to the foregoing uses, certain of the addition compounds such as the addition compound of piperazine and 1,2-propylene glycol are useful as antihelminthics.

Since one mol of the vicinal glycol reacts with one mol of the cyclic diamine to form the addition compounds of the invention, it is preferable, therefore, to react the constituents of the addition compounds on an equal mol basis. However, an excess of either constituent can be employed, as will be apparent from certain of the examples hereinafter set forth. The compositions of the invention are true addition compounds and, as such, there is no generally accepted theory whereby a structural formula can be assigned to them. Although the temperature at which the reaction is carried out is not critical, the addition compounds are, in general, prepared at or about room temperature.

Examples of vicinal glycols which can be employed to prepare the compositions of the invention include 1,2-propylene glycol, ethylene glycol and 2,3-butylene glycol. Although trimethylolethane is not a vicinal glycol, it does, however, form a solid addition compound with the cyclic diamines.

Examples of the cyclic diamines which can be employed to prepare the compositions of the invention include cis-2,5-dimethylpiperazine, 2-methylpiperazine, piperazine, trans-2,5-dimethylpiperazine and 2,3,5,6-tetramethylpiperazine.

The physical characteristics, including the melting points, of addition compounds which are illustrative of the compounds of the invention are set forth in Table I below:

TABLE I

| Vicinal Glycol | Cyclic Diamine | | | | |
|---|---|---|---|---|---|
| | Cis-2,5-DMP[1] | 2-MP[2] | Piperazine | Trans-2,5-DMP[3] | 2,3,5,6-TMP[4] |
| 1,2-Propylene Glycol | Liquid | Liquid | 20–25 | 74.5–75.5 | 72–74 |
| Ethylene Glycol | Liquid | Liquid | 73–75.5 | 84–84.5 | 116–125 |
| 2,3-Butylene Glycol | 66–67 | 76–77 | 99–99.5 | 101.5–102.5 | 71–72 / 109.0–109.7 / 142.5–143.5 |

[1] Cis-2,5-dimethylpiperazine.
[2] 2-methylpiperazine.
[3] Trans-2,5-dimethylpiperazine.
[4] 2,3,5,6-tetramethylpiperazine.

The solid addition compounds can be prepared by dissolving the cyclic diamine in a suitable solvent such as benzene or acetone and adding the vicinal glycol thereto. The solution is heated in order to completely solubilize the addition compound. Upon cooling the solution, the addition compound recrystallizes from the solvent and can be separated therefrom by filtration or decantation.

The liquid addition compounds can be prepared by dissolving the cyclic diamine in a suitable solvent such as benzene or acetone and adding the vicinal glycol thereto. The resulting solution is heated and allowed to cool. The liquid addition compound can be recovered in good yield by distilling off the solvent.

The following examples are given to illustrate this invention further and are not to be construed as limiting the invention except as defined in the appended claims.

Example I 10.0 grams of ethylene glycol were added to a flask containing 22.84 grams of trans-2,5-DMP (DMP=dimethylpiperazine) at an initial temperature of 26° C. The temperature rose to 31° C. The contents of the flask were converted to a moist solid. The solid was dissolved in benzene at a temperature of 50–55° C. and was recrystallized therefrom at a temperature of 10° C. There was obtained an addition compound of ethylene glycol and trans-2,5-DMP having a melting point of 84.0–84.5° C. and weighing 29.0 grams.

Example II 11.42 grams of trans-2,5-DMP dissolved in 103 grams of benzene were added to 10 grams of ethylene glycol. A turbid solution resulted with the evolution of heat, The solution was heated and it separated into two layers. The bottom layer was ethylene glycol. The top layer was decanted from the flask. Additional benzene was added to the ethylene glycol to remove the remaining addition compound. The several benzene layers were combined, concentrated, and allowed to cool. Upon cooling of the solution, there was obtained 16.08 grams of an addition compound of ethylene glycol and trans-2,5-DMP having a melting point of 83.5–84.0° C.

Example III 2.50 grams of ethylene glycol were added to 11.42 grams of trans-2,5-DMP dissolved in 103 grams of benzene. The solution was heated and allowed to cool. There was obtained an addition compound of ethylene glycol and trans-2,5-DMP which had a melting point of 84.5–85.4° C. and weighed 8.38 grams.

Example IV 2.50 grams of ethylene glycol were added to 5.01 grams of 2-methylpiperazine dissolved in 45 grams of benzene. A turbid emulsion resulted which was allowed to settle. The benzene was removed therefrom. There was obtained a liquid addition compound of ethylene glycol and 2-methylpiperazine.

Example V 4.31 grams of piperazine were reacted with 3.10 grams of ethylene glycol in the presence of 50 ml. of benzene. The solution was heated and allowed to cool. The precipitate obtained was recrystallized from benzene. There was obtained an addition compound of ethylene glycol and piperazine having a melting point of 73.0–75.5° C.

Example VI 5.71 grams of cis-2,5-DMP were reacted with 3.1 grams of ethylene glycol in the presence of 50 ml. of benzene. After distilling off the benzene, there was obtained a liquid addition compound of ethylene glycol and cis-2,5-DMP.

Example VII 2,3,5,6-tetramethylpiperazine was reacted with ethylene glycol. There was obtained a solid addition compound of tetramethylpiperazine and ethylene glycol having a melting point of 116–125° C.

Example VIII 4.31 grams of piperazine were reacted with 3.8 grams of 1,2-propylene glycol in the presence of benzene. The solution was heated and allowed to cool. A solid product precipitated from the solution and was recrystallized from benzene. There was obtained a solid addition compound of piperazine and 1,2-propylene glycol having a melting point of 20–25° C.

Example IX 5.71 grams of cis-2,5-DMP were reacted with 3.80 grams of propylene glycol in the presence of 50 ml. of benzene. After distilling off the benzene, there was obtained a liquid addition compound of cis-2,5-DMP and 1,2-propylene glycol.

Example X 1,2-propylene glycol was reacted with 2,3,5,6-tetramethylpiperazine. There was obtained a solid addition compound of 1,2-propylene glycol and tetramethylpiperazine.

Example XI 5.01 grams of 2-methylpiperazine were dissolved in 45 grams of benzene and 3.80 grams of 1,2-propylene glycol were added thereto. After distilling off the benzene, there was obtained 7.8 grams of a liquid addition compound of 2-methylpiperazine and 1,2-propylene glycol.

Example XII 5.71 grams of trans-2,5-DMP were dissolved in 5.1 grams of benzene and 3.80 grams of 1,2-propylene glycol were added thereto. The solution was heated and allowed to cool. A precipitate was separated from the solution and recrystallized from benzene. There was obtained a solid addition compound of trans-2,5-DMP and 1,2-propylene glycol having a melting point of 74.5–75.5° C.

Example XIII 5.71 grams of trans-2,5-DMP were dissolved in 51 grams of benzene and 4.51 grams of 2,3-butylene glycol were added thereto. The solution was heated and allowed to cool. A precipitate was separated from the solution. There was obtained a solid addition compound of trans-2,5-DMP and 2,3-butylene glycol having a melting point of 101.5–102.5° C.

Example XIV 5.01 grams of 2-methylpiperazine were dissolved in 45 grams of benzene and 4.51 grams of 2,3-butylene glycol were added thereto. After distilling off the benzene, there was obtained a solid addition compound of 2-methylpiperazine and 2,3-butylene glycol having a melting point of 76–77° C.

Example XV 5.71 grams of cis-2,5-DMP were dissolved in 50 ml. of benzene and 4.51 grams of 2,3-butylene glycol were added thereto. The solution was heated and allowed to cool. There was obtained a solid addition compound of cis-2,5-DMP and 2,3-butylene glycol having a melting point of 66–67° C.

Example XVI 4.31 grams of piperazine were dissolved in 50 ml. of benzene and 4.51 grams of 2,3-butylene glycol were added thereto. The solution was heated and allowed to cool. There was obtained a solid addition compound of piperazine and 2,3-butylene glycol having a melting point of 99.0–99.5° C.

Example XVII 2,3-butylene glycol was reacted with 2,3,5,6-tetramethylpiperazine. There was obtained a solid addition compound. Three isomers of the solid addition compound were isolated and had melting points of 142.5–143.0° C., 109.0–109.7° C., and 71–72° C.

Example XVIII 5 grams of trimethylolethane were added to 28 grams of trans-2,5-DMP and heat was applied until a melt formed. Upon cooling, but before complete solidification, benzene was added. The resulting solution was heated and allowed to cool. There was obtained a solid addition compound of trimethylolethane and trans-2,5-DMP having a melting point of 85.0–86.0° C.

What is claimed is:

1. An addition compound in accordance with the following formula:

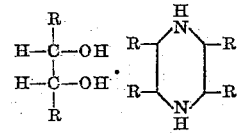

wherein R is a member selected from the group consisting of H, methyl and ethyl radicals.

2. An addition compound according to the formula:

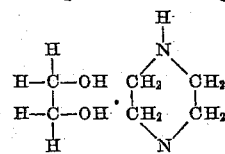

3. An addition compound according to the formula:

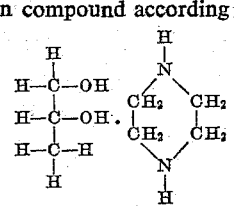

4. An addition compound according to the formula:

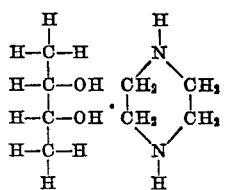

5. An addition compound according to the formula:

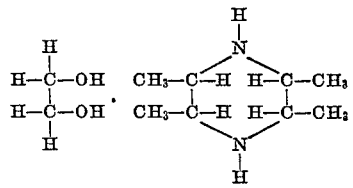

6. An addition compound according to the formula:

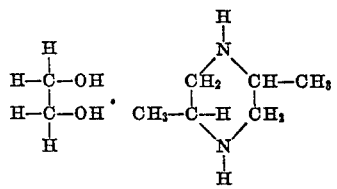

7. A process which comprises bringing into contact at about room temperature a compound selected from the group consisting of glycols of the formula:

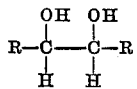

and trimethylolethane with a cyclic diamine of the formula:

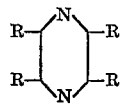

wherein R is a member selected from the group consisting of hydrogen, methyl and ethyl radicals and isolating an addition product.

References Cited in the file of this patent
UNITED STATES PATENTS 2,754,330   Schreyer _____ July 10, 1956
2,810,676   Hadler et al. _____ Oct. 22, 1957

OTHER REFERENCES

Ishiguro et al.: Jour. Pharm. Soc. (Japan), vol. 77, pp. 1051–1054 (1957).

Whitmore: Organic Chemistry, p. 304, 2nd edition (1951).

Hromatka et al.: Berichte Deut. Chem. Gesellschaft, vol. 76, pp. 712–717 (1943).

Datta et al.: Jour. Amer. Chem. Soc., vol. 45, pp. 2430–2433 (1923).